(12) United States Patent
Bell

(10) Patent No.: US 10,600,395 B2
(45) Date of Patent: Mar. 24, 2020

(54) MINIATURE INTERACTIVE LIGHTED ELECTRONIC DRUM KIT

(71) Applicant: Marlan Bell, Tualatin, OR (US)

(72) Inventor: Marlan Bell, Tualatin, OR (US)

(*) Notice: Subject to any disclaimer, the term of this patent is extended or adjusted under 35 U.S.C. 154(b) by 0 days.

(21) Appl. No.: 16/212,023

(22) Filed: Dec. 6, 2018

(65) Prior Publication Data

US 2019/0108821 A1    Apr. 11, 2019

Related U.S. Application Data

(63) Continuation-in-part of application No. 15/952,184, filed on Apr. 12, 2018, now abandoned.
(Continued)

(51) Int. Cl.

| | | |
|---|---|---|
| *G10D 13/02* | (2020.01) | |
| *G10D 15/00* | (2006.01) | |
| *G10D 13/00* | (2020.01) | |
| *G10H 1/00* | (2006.01) | |
| *H04R 1/02* | (2006.01) | |

(Continued)

(52) U.S. Cl.
CPC ............ *G10D 13/024* (2013.01); *A63H 5/00* (2013.01); *A63H 33/22* (2013.01); *G09G 3/22* (2013.01); *G10D 13/00* (2013.01); *G10D 13/026* (2013.01); *G10D 15/00* (2013.01); *G10H 1/0041* (2013.01); *H04R 1/028* (2013.01); *H05B 37/029* (2013.01); *H05B 37/0236* (2013.01); *G10H 2220/061* (2013.01); *G10H 2230/055* (2013.01); *G10H 2230/281* (2013.01)

(58) Field of Classification Search
CPC ...... G10D 13/024; G10D 13/02; G10D 13/00; G10D 13/026; G10D 15/00; A63H 5/00; A63H 33/30; G10H 1/26; G10H 1/34; G10H 3/146; G10H 2220/061; G10H 2230/055; G10H 2230/281; G10H 1/0041; G09G 3/22; H04R 1/028; H05B 37/0236; H05B 37/029
USPC ................................................ 84/411 R, 421
See application file for complete search history.

(56) References Cited

U.S. PATENT DOCUMENTS

| | | | | |
|---|---|---|---|---|
| 1,348,386 A | * | 8/1920 | Wronowski | ............ A63H 13/00 446/265 |
| 1,462,006 A | * | 7/1923 | Hall | ........................ A63H 13/00 40/419 |

(Continued)

*Primary Examiner* — David S Warren
*Assistant Examiner* — Christina M Schreiber
(74) *Attorney, Agent, or Firm* — Boudwin Intellectual Property; Daniel Boudwin

(57) ABSTRACT

A miniature interactive lighted electronic drum kit is provided. The kit includes a supporting base member, a drum set, and a cymbal set. The drum set cymbal set each includes at least one scaled miniature representation of a musical percussion instrument. The kit further includes one or more speakers, a plurality of light sources, which are mounted within or on the drum kit and base, and a microcontroller in operable communication with a power source, the one or more speakers, and/or a plurality of light sources. One or more switches is operably connected to the microcontroller, wherein actuation of the switches may cause them to initiate a sequence of electrical signals to activate the one or more figures and/or activate at least one of the plurality of lights. The one or more switches are attached to a miniature bass drum and cymbal stand pedals.

17 Claims, 5 Drawing Sheets

US 10,600,395 B2
Page 2

Related U.S. Application Data

(60) Provisional application No. 62/484,660, filed on Apr. 12, 2017.

(51) Int. Cl.
  *H05B 37/02* (2006.01)
  *G09G 3/22* (2006.01)
  *A63H 5/00* (2006.01)
  *A63H 33/22* (2006.01)

(56) References Cited

U.S. PATENT DOCUMENTS

| | | | | |
|---|---|---|---|---|
| 3,551,580 A * | 12/1970 | Glenn | ................... | G10H 3/146 84/723 |
| 3,580,126 A * | 5/1971 | Forkner | ................... | A63J 17/00 84/464 R |
| 4,169,335 A * | 10/1979 | Betancourt | ............ | A63H 13/04 446/297 |
| 5,040,319 A * | 8/1991 | Wang | ................... | A63H 13/00 40/414 |
| 5,136,487 A * | 8/1992 | Schmidt | ............. | H05B 37/0236 362/253 |
| 5,228,433 A * | 7/1993 | Rosen | ................... | A61H 13/00 15/227 |
| 5,270,480 A * | 12/1993 | Hikawa | ................. | A63H 13/00 446/298 |
| 5,280,742 A * | 1/1994 | Vergara | ................... | F21V 23/04 84/411 R |
| 5,438,154 A * | 8/1995 | Segan | ................... | G04B 25/06 368/273 |
| 5,550,319 A * | 8/1996 | Segan | ....................... | G10F 1/10 116/155 |
| 6,063,992 A * | 5/2000 | Schwagerl | ........... | G10D 13/029 84/411 P |
| D477,371 S * | 7/2003 | Niu | ................. | D17/22 |
| 6,716,031 B2 * | 4/2004 | Wood | ..................... | A63H 33/00 434/159 |
| 6,822,154 B1 * | 11/2004 | Thai | ......................... | G10H 1/26 446/408 |
| 7,163,431 B2 * | 1/2007 | Walraven | .................. | A63H 5/00 446/408 |
| 8,029,329 B2 * | 10/2011 | Greenley | ............. | A63H 33/005 446/318 |
| 8,287,376 B2 * | 10/2012 | Lan | ........................ | G10H 3/146 463/36 |
| 8,324,492 B2 * | 12/2012 | Feeney | ..................... | A63H 5/00 446/175 |
| 8,444,452 B2 * | 5/2013 | Dang | ..................... | A63H 13/02 446/397 |
| 8,642,873 B2 * | 2/2014 | Liotta | ................... | H04R 1/1033 2/90 |
| 8,912,419 B2 * | 12/2014 | Fong | ........................ | G10H 1/26 84/600 |
| 2004/0141321 A1 * | 7/2004 | Dowling | ................ | A63H 33/22 362/276 |
| 2007/0221040 A1 * | 9/2007 | Bailey | ..................... | G10D 13/00 84/411 R |
| 2011/0113948 A1 * | 5/2011 | Izen | ..................... | G10D 13/026 84/411 R |
| 2011/0132181 A1 * | 6/2011 | Kockovic | ................ | G10H 1/34 84/723 |
| 2011/0271817 A1 * | 11/2011 | Hsien | ..................... | G10D 13/00 84/421 |
| 2012/0204704 A1 * | 8/2012 | Shim | ..................... | G10H 1/0066 84/645 |
| 2014/0273722 A1 * | 9/2014 | Chan | ..................... | A63H 33/22 446/268 |
| 2015/0114210 A1 * | 4/2015 | Ho | ........................ | G10D 13/024 84/723 |
| 2016/0067620 A1 * | 3/2016 | Raderman | ................ | A63H 5/00 446/408 |
| 2016/0343360 A1 * | 11/2016 | Bailey | .................. | G10D 13/065 |
| 2017/0050694 A1 * | 2/2017 | Pestritto | .................. | B62J 11/00 |
| 2018/0301126 A1 * | 10/2018 | Bell | ....................... | A63H 33/30 |
| 2019/0108821 A1 * | 4/2019 | Bell | ....................... | G10D 15/00 |

* cited by examiner

MINIATURE INTERACTIVE LIGHTED ELECTRONIC DRUM KIT

CROSS REFERENCE TO RELATED APPLICATION

This continuation-in-part application claims the benefit of U.S. patent application Ser. No. 15/952,184 filed on Apr. 12, 2018 and U.S. Provisional Application No. 62/484,660 filed on Apr. 12, 2017. The above identified patent application is herein incorporated by reference in its entirety to provide continuity of disclosure.

BACKGROUND OF THE INVENTION

The present invention relates to interactive miniature devices for music enthusiasts, specifically for persons who enjoy playing jazz or trap style drum sets.

Miniature models of musical instruments are popular. Such models are often purchased or created to show an individual's appreciation for music and an enthusiasm for the instruments themselves. Currently, typical musical instrument models are limited to use as an inert visual display. There is a desire for these models, with new technology, to be interactive and to provide a visual display and audio playback adding a more dynamic experience with the model. For use in music studios or as a desktop display, it would be desirable if these display models were capable of rendering a true representation of a drum performance with internal lights and sound to represent the appropriate sequence of drum and cymbal strikes in the performance.

Devices have been disclosed in the known art that relate to miniature musical desktop ornaments. However, these devices are not interactive. They do not, for example, provide finger operated pedal style switches. Such switches could be used to initiate transmission of electrical signals and coordinate audio playback and lighting effects or activate other devices.

In light of the devices disclosed in the known art, it is submitted that the present invention substantially diverges in design elements from the known art and consequently it is clear that there is a need in the art for an improvement to existing interactive miniature musical instrument models. In this regard the invention presented here substantially fulfills those needs.

SUMMARY OF THE INVENTION

In view of the foregoing disadvantages inherent in the known types of interactive miniature musical models now present in the known art, the present invention provides a miniature interactive lighted electronic drum kit that can be utilized for providing a sublime interface for the user when interacting with a miniature drum set.

The present invention provides a miniature interactive lighted electronic drum kit that includes a base member including a drum set and cymbal set, wherein the drum and cymbal sets each includes at least one scaled miniature representation of a musical percussion instrument. The kit further includes one or more speakers, a plurality of light sources, and a microcontroller in operable communication with a power source, the one or more speakers, and the plurality of light sources. Switches may be operably connected to the microcontroller, wherein the switches may be configured to cause the microcontroller to transmit electrical signals to the one or more speakers, and to activate at least one of the plurality of lights. The kit includes multiple switches that are attached to a miniature base drum rim and/or cymbal stand pedals. These switches may also be used to access and initiate playback of stored recorded data such that countless visual patterns representing a drum performance may be achieved and displayed with lights representing the drum used.

One object of the present invention is to provide miniature interactive lighted electronic drum kit that includes individual miniature representations of percussion instruments each coupled to finger operated switches that initiate the playback of a sound that the full size instrument would produce.

Another object of the present invention is to provide a miniature interactive lighted electronic drum kit that includes a plurality of light sources that are configured to illuminate a sequence corresponding to the sequence of drum and cymbal strikes as emitted from the one or more speakers.

A further object of the present invention is to provide a miniature interactive lighted electronic drum kit that can emit sounds obtained via an recorded data stored on an internal non-transitory memory, obtained wirelessly via a wireless transceiver, or obtained by receiving audio input through a microphone, and interpolating the corresponding drum sequence pattern for a lighted display via the use of a field programmable gate array system.

Another object of the present invention is to provide a miniature interactive lighted electronic drum kit configured to simulate a lighted display of a live performance, which may also be used to access and initiate playback and display of a live performance, stored, and recorded material such that countless audio and visual patterns, with lighted sequences representing a drum performance.

Yet another object of the present invention to provide a miniature interactive lighted electronic drum kit that may include any number or combination of a bass drum, a small rack tom drum, a large rack tom drum, a floor tom drum, a snare drum, a conga drum, a bongo drum, a ride cymbal, a crash cymbal, a splash cymbal, a tambourine, a cowbell, a gong cymbal, and a hi-hat cymbal set (upper and lower).

Still a further object of the present invention is to provide a miniature interactive lighted electronic drum kit that can be customized with different amounts and arrangements of removably securable miniature representation of musical instruments.

An additional object of the present invention is to provide a miniature interactive lighted electronic drum kit that can be remotely operated via an electronic device such as a smartphone, tablet, computer, or the like.

Still the fundamental object of the present invention is to provide a miniature interactive lighted electronic drum kit that includes various light sources, such as LEDs, built into the drums to provide a synchronized visual effect, such that the light sources illuminate in a pattern that corresponds the playback of drum and cymbal strikes to display a light flash sequence in concert with the original drummed sequence, wherein such light source patterns and sound playback can be produced by real time direct input from wireless technologies like WI FI, Bluetooth, AM/FM radio, or any other suitable technologies.

Yet a further object of the present invention is to provide a miniature interactive lighted electronic drum kit set that may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
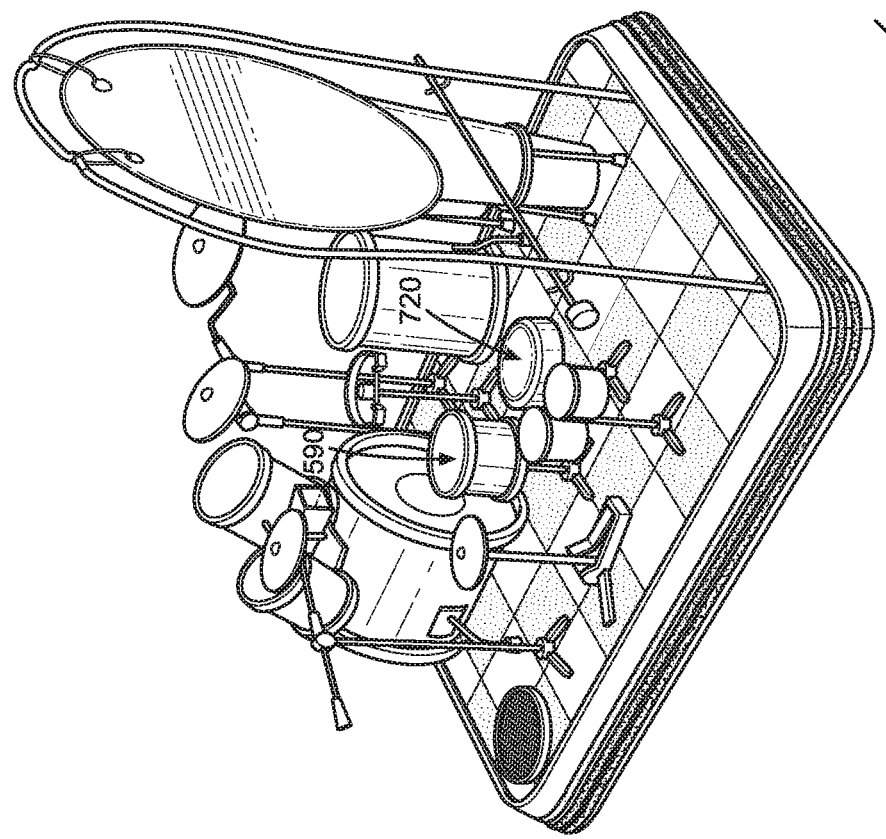
FIG. 1 shows front and rear perspective views of one embodiment of the miniature interactive lighted electronic drum kit.
Figure 1:
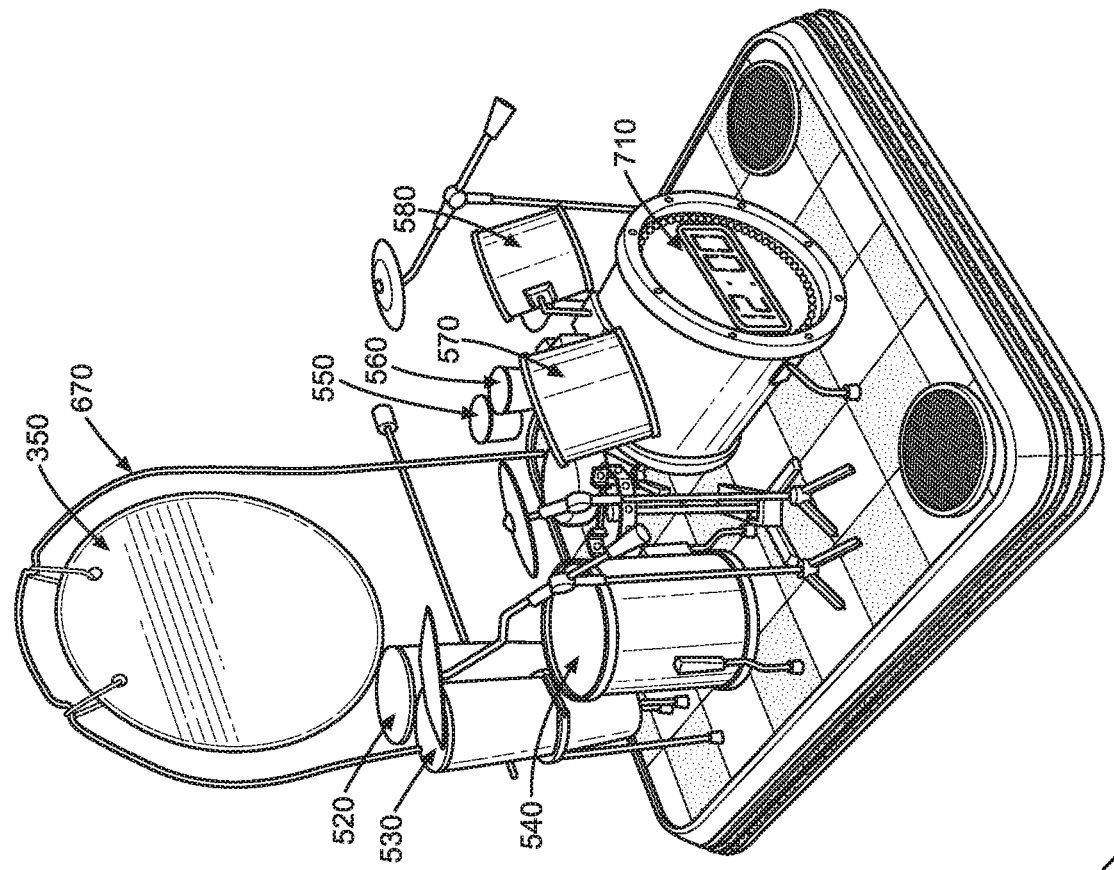

Reference is made herein to the attached drawings. Like reference numerals are used throughout the drawings to depict like or similar elements of the miniature interactive drummer kit. For the purposes of presenting a brief and clear description of the present invention, the preferred embodiment will be discussed as used for providing a miniature interactive lighted electronic drum kit. The figures are intended for representative purposes only and should not be considered to be limiting in any respect.

Figure 4:
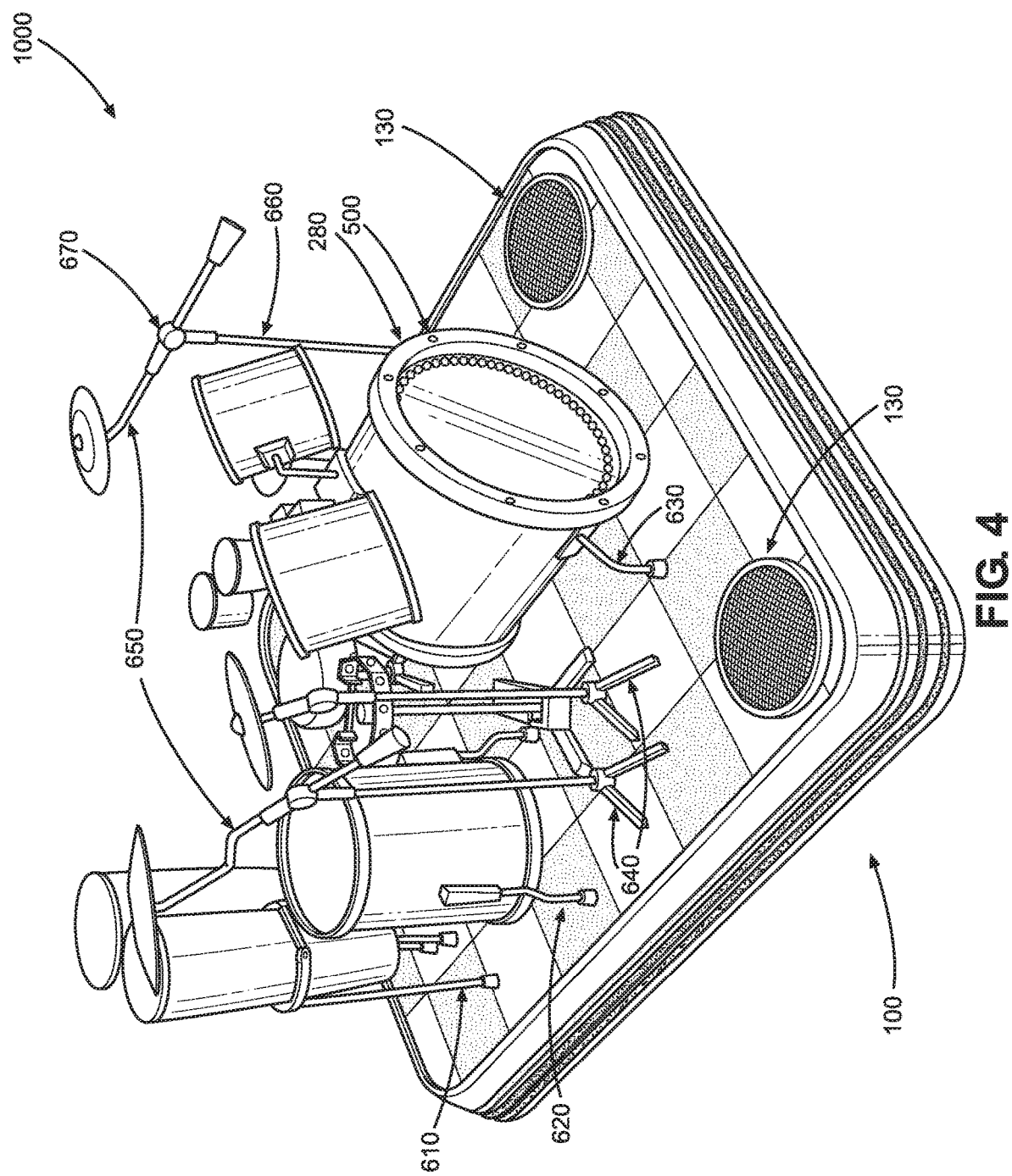
FIG. 4 shows a front perspective view of an embodiment of the miniature interactive lighted electronic drum kit with the speakers mounted in the base.

Referring now to FIG. 4, there is shown a visual depiction of the sound emanating from the speakers mounted in the base. Placement of components, such as the speakers, drums, cymbals, and lights are reconfigurable.

Figure 5:
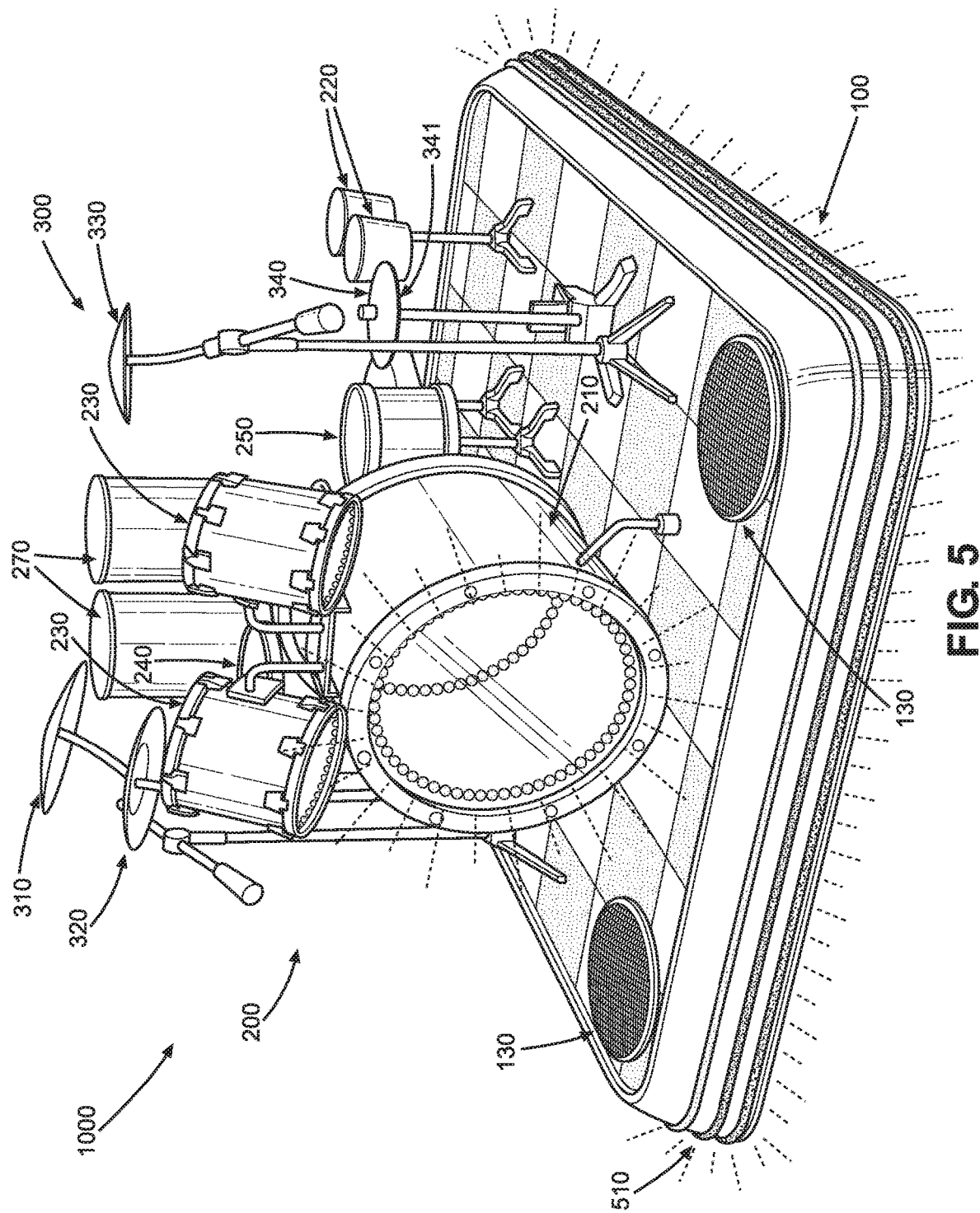
FIG. 5 shows a front perspective view of an embodiment of the miniature interactive lighted electronic drum kit showing how lights would provide a sharp contrast for the drum kit with limited background lighting.

As shown in FIG. 5, The miniature interactive drummer kit 1000 comprises a multi-piece drum set 200 and a multi-piece cymbal set 300 that are removably mounted on a base member 100, such that individual components from both the drum set 200 and the cymbal set 300 can be mounted together in a variety of unique combination and configurations. The individual components from both the drum set 200 and the cymbal set 300 include scaled miniature representation of musical percussion instruments, such as a trap-style drum set, for example. The individual components from both the drum set 200 and the cymbal set 300 are removably secured to the base 100 via a fastener, such as friction fit members, glue, magnets, and the like.

The multi-piece drum set 200 and multi-piece cymbal set 300 are shaped and proportioned to be $\frac{1}{8}^{th}$ of actual size. The base member 100 includes a microcontroller unit (within it and not shown) and a power source (within it and not shown) that are configured to provide power to the electrical components connected to the base member 100. The power source may be a removable battery, a rechargeable battery, a wired connection with a wall outlet, or any other suitable power source. The microcontroller unit is operably connected to the power source and to one or more speakers 130. The speakers 130 are mounted on the base member 100. A plurality of light sources are included (not shown but referenced by the drum shells they reside in with 520, 530, 540, 550, 560, 570, 580, and 590) (see FIG. 1). The light sources are configured to provide illumination of the drum heads from within, and combined with the audio output from the speakers they create a synchronized audio-visual effect. It should be understood that within the scope of the present invention any arrangement and number of light sources can be utilized.

The microcontroller controls the transmission of electric signals to operate the speakers and lights. The electrical signals may be transmitted via wired circuits, fiber optic cables, or any other suitable mechanism for transmitting information as an electronic signal, and it should be understood that all known mechanisms for transmitting electrical signals fall under the scope of the present invention. In one embodiment, the light sources are configured to selectively flash in either a clockwise pattern, counter clockwise pattern, or a single burst upon receiving a corresponding electrical input from the microcontroller. In other embodiments, the light sources can be controlled via the microcontroller to flash in any type of pattern.

More specifically, the microcontroller unit can be used to playback drum sequence audio data and to control the timing of the illumination of light sources within the drum shells such that each pulse of light and sound coincide with a drum beat, or cymbal strike, from a recording that includes drum sequence audio data. In one embodiment, the drum sequence audio data is a portion of a song stored on a non-transitory memory that is operably connected to and in operable communication with the microcontroller. In alternative embodiments, the drum sequence audio data is stored on a network accessible by the present invention through available technology such as wireless transceivers. In yet another embodiment, the base member includes a microphone configured to receive and interpolate, through the use of a field-programmable gate array (FPGA) system, a musical portion (frequency signature) of a song and re-create a visual display of the drum sequence (with the drum shell lights) while simultaneously playing the audio transmission via the speakers 130. The field-programmable gate array system includes a logic that is configured to interpolate a unique frequency signature of the recorded audio. The microcontroller combines user generated signals from the switches (see FIGS. 2 & 3) to initiate audio playback from the speakers 130, and lighting effects from light sources within the drum shells creating an immersive and interactive user experience. In other embodiments, the microcontroller is also configured to connect to the internet such that it can be remotely operated by means of a smartphone or computer application.

Referring now to FIG. 5, there is shown a perspective view of the drum set showing how lights would provide a sharp contrast for the drum set with limited background lighting. In the illustrated embodiment, the drum set 200 includes one or more bass drums 210, one or more bongo style drums 220, one or more large rack tom drums 230, one or more floor tom drums 240, and one or more snare drums 250, and one or more conga style drums 270, such that the multi-piece drum set 200 is configured to have the look and feel of a traditional trap style drum set. The cymbal set includes one or more ride cymbals 310, one or more crash cymbals 320, one or more splash cymbals 330, one or more hi-hat upper and lower cymbals 340, 341, and one or more gong style cymbals 350 (see FIG. 1). The drums are stabilized and attached to the base with feet 610, 620, and 630. The cymbals are supported by cymbal extension arms 650. They are attached to the vertical cymbal stands 660, with stand elbows 670 (see FIG. 4). The vertical cymbal stands 660 are attached to the cymbal stand bases 640. The cymbal stand bases 640 are attached to the base 100 as described previously (see FIG. 4). These components may or may not be conductive such that they could pass electromagnetic signals to the cymbals.

Furthermore, in addition to the light inside the drum shells, there may be additional lighting 510 along the outer perimeter of the speakers 130 on the base member 100 (see FIG. 5).

Also, and in addition to LEDS mounted in the drum shells and base, the design includes several LEDs 500 mounted in the front bass drum rim 280, where the drum head tightening nuts would have been (see FIG. 4). These multiple LEDs 500 may flash in response to bass drum strikes from the finger switch or signals input from external sources. The software for this may provide a multiple flash delay effect, sequentially rotating the flashes clockwise or counterclockwise, with each bass drum strike or signal input.

Figure 2:
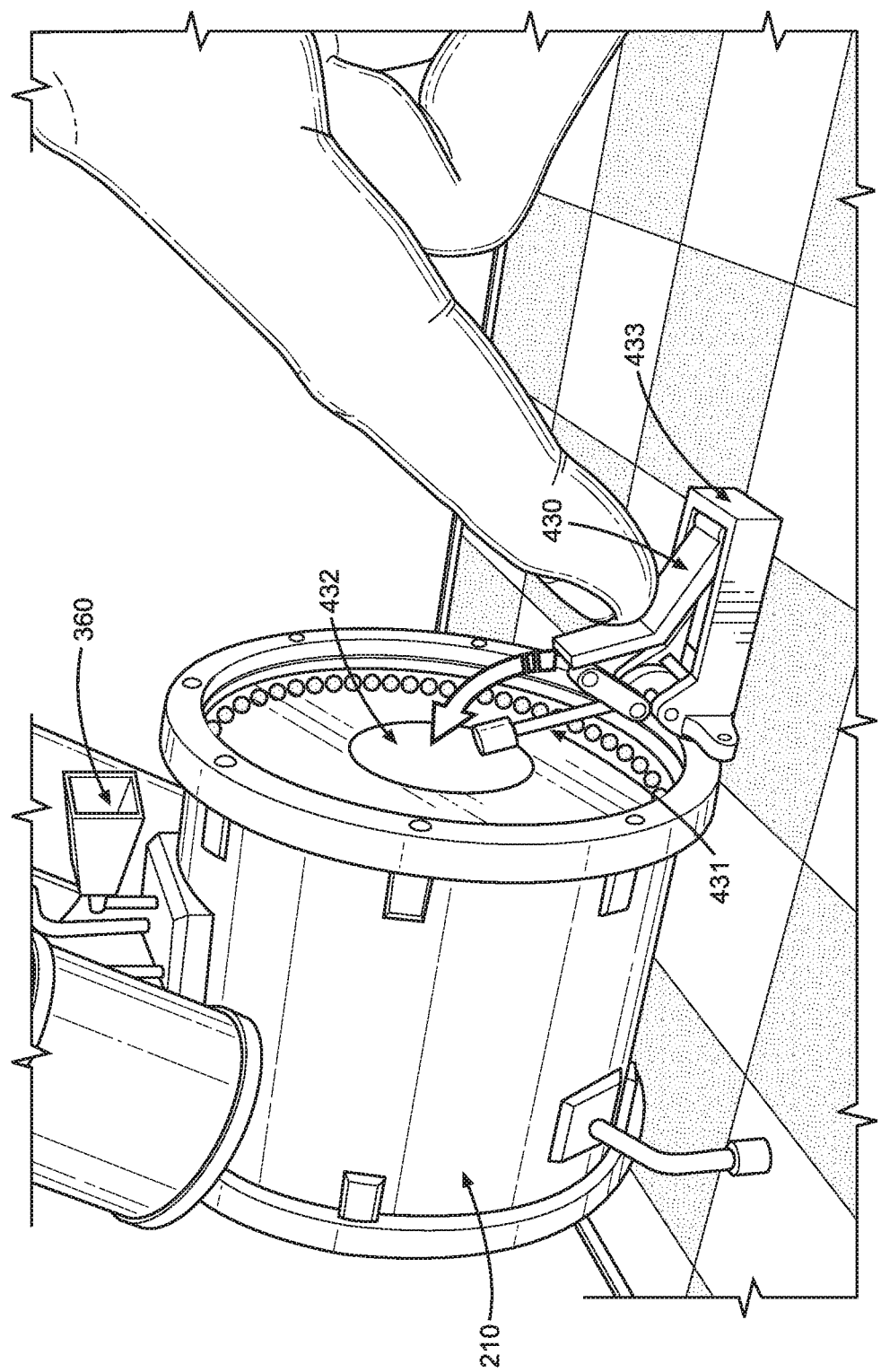
FIG. 2 shows a perspective view of a bass drum foot pedal switch in use, and how it would rotate, contacting the bass drum head when actuated by the index finger.

Referring now to FIG. 2, there is shown a visualization of the bass drum foot pedal switch in use, and how it would rotate, contacting the bass drum head 432 when actuated by the index finger. The bass drum foot pedal switch 430 is movably disposed within a switch housing 433 and is configured to simulate the rotational movement of a full-sized bass drum foot pedal when the switch 430 is actuated. The switch housing is secured to the rear bass drum rim 280, and to the base 100.

Figure 3:
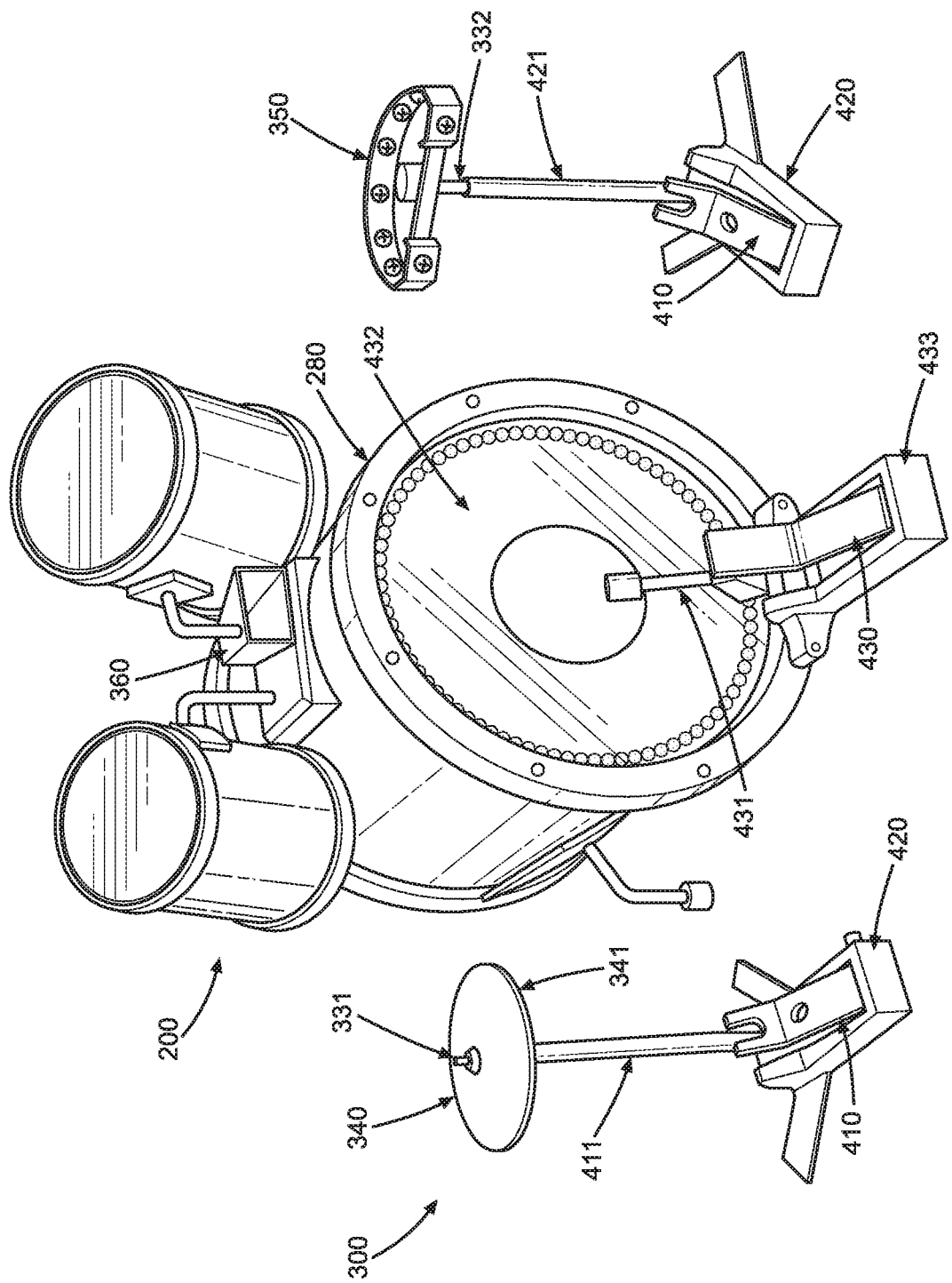
FIG. 3 shows a perspective view of three different embodiments of switches used in for activation of the miniature interactive lighted electronic drum kit.

Referring now to FIG. 3, there is shown a perspective view of two additional switches used in the drum kit. The switch levers 410 and 430 are configured to allow one or more fingers to actuate them within the switch bodies and rotate them, by pressing down, such that they pull an internal conduit 331 and 332 downwardly through hollow tubes 411 and 421, respectively. This will pull the upper hi hat cymbal 340 and/or tambourine 350 downward to simulate the action of playing the drum sets pedals. In the illustrated embodiment shown in FIG. 3, a first switch 410 is operably connected to the upper hi-hat cymbal 340 via the internal conduit 331, such that upon pressing down on the lever of switch 410, the conduit 331 draws the upper hi hat cymbal 340 downward to contact the lower cymbal 341. Similarly, a second switch 420 is operably connected to a representative tambourine component of the drum set 350, such that upon pressing down on the lever of the switch 410, an internal conduit 332 through tube 421 moves the tambourine 350 up or down. The switches induce the movement of components and may be used to activate the speakers and lights. Components of the cymbal set may be ferrous and/or magnetic and move or "twitch" with appropriate electromagnetic signals similar to, and in combination with, the signals provided through a wiring harness (not shown), and/or conductive components that illuminate the drum lights.

FIG. 3. shows the switch 410 on the left (hi-hat) and right 420 (tambourine) using the same linear vertical actuation design with conduits, however the bass drum switch 433 uses rotational actuation as shown in FIG. 2. This also shows how the switch assembly and tom drums are attached to the bass drum. This view also shows how a decorative cowbell 360 is mounted between the large and small tom drums. The third switch 430 is operably connected to a bass drum rim 280, such that when a finger presses down on the switch lever 430 (housed within a switch body 433) a striker mallet 431 rotates towards the bass drum head 432, and upon releasing the switch 430 the striker mallet returns to its original position.

More generally, switches 410, 420 for elements of the cymbal set 300 utilize up and downward motion of a conduit within tubular housings 411, 421. Additionally, switch 430 for elements of the drum set 200 utilizes a two-step process of first rotating a lever arm having a striker mallet 431 towards and then away from the base drum head 432. The cymbal movement may be generated with electrical and/or magnetic impulses when appropriate.

Referring now to FIG. 1, and to summarize, there are shown perspective views of the complete set from the front and rear, of a set of miniature percussion instruments affixed to a rectangular base with gong cymbal included. The base including a microprocessor (not shown), speakers, electrical harness and circuitry, AM/FM receiver, and logic software (WI FI/Bluetooth) within it, or it may be patched to external digital/analog resources with appropriate wiring. The bass drum may also house unrelated items such as a clock 710 (see FIG. 1), motion sensor, camera, and/or video projector within it. The non-transitory memory operably connected to the microprocessor may be created, copied, modified, or have information added to or deleted from it using communication port inputs and wireless transceiver signals. The switches (shown in FIG. 3) may trigger such functions as well. Also not shown are communication ports for other inputs or jacks i.e.; AC power, recharger, USB, RCA, and phono type for direct input. Also not shown, are the LEDs placed within the drum shells and wiring, or an internal DC power source.

The particular arrangement of the drum kit shown here also includes a drummer's seat 720 (see FIG. 1) which may be decorative, but may also contain an additional spring loaded contact switch (not shown). This switch may be used to activate devices such as described with the other switches.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, manufacture, assembly and/or use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact manufacture, construction, and/or operation shown and described, and accordingly, all suitable modifications and equivalents may be resorted to, falling within the scope of the invention.

I claim:

1. A miniature interactive lighted electronic drum kit, comprising:
   a base member including a drum set and cymbal set, wherein the drum set cymbal set each includes at least one scaled miniature representation of a musical instrument;
   one or more speakers;

a plurality of light sources;
a microcontroller in operable communication with a power source, the one or more speakers, and the plurality of light sources;
a switch operably connected to the microcontroller, wherein the switch is configured to cause the microcontroller to transmit electrical signals to the one or more speakers and to at least one of the plurality of lights upon actuation of the switch;
a microphone configured to receive audio input; and
a field-programmable gate array system operably connected to the microcontroller.

2. The miniature interactive lighted electronic drum kit of claim 1, wherein the electrical signals comprises recorded drum sequence digital or audio data, and wherein at least one light source of the plurality of light sources is configured to illuminate in a pattern that is synchronized with a pattern of the recorded drum sequence digital or audio data.

3. The miniature interactive lighted electronic drum kit of claim 1, further comprising a wireless transceiver in operable communication with the microcontroller, such that the microcontroller is configured to be remotely operated by an electronic device that is in wireless communication with the wireless transceiver.

4. The miniature interactive lighted electronic drum kit of claim 3, wherein the electrical signals comprise audio or digital data that is stored remotely and is received via the wireless transceiver over a wireless network.

5. The miniature interactive lighted electronic drum kit of claim 1, wherein at least one light source of the plurality of light sources is coupled to a particular scaled miniature representation of the musical instrument of the drum set.

6. The miniature interactive lighted electronic drum kit of claim 1, wherein at least one of the cymbals of the cymbal set, is configured to move in response to an electrical signal input.

7. The miniature interactive lighted electronic drum kit of claim 1, wherein the drum set and cymbal set is removably secured to the base via one or more fasteners.

8. The miniature interactive lighted electronic drum kit of claim 7, wherein the fastener is selected is selected from the group of a friction fit connector, a magnet, and an adhesive.

9. The miniature interactive lighted electronic drum kit of claim 1, wherein the drum and cymbal set includes at least one scaled miniature representation of a musical instrument selected from the group of: a bass drum, a small rack tom drum, a large rack tom drum, a floor tom drum, a snare drum, a bongo drum, and a conga drum.

10. The miniature interactive lighted electronic drum kit of claim 1, wherein the drum and cymbal set includes at least one scaled miniature representation of a musical instrument selected from the group of: a ride cymbal, a crash cymbal, a splash cymbal, a tambourine, a cowbell, a gong cymbal, and a hi-hat cymbal set that includes an upper hi-hat cymbal and a lower hi-hat cymbal.

11. The miniature interactive lighted electronic drum kit of claim 1, wherein the switch comprises a plurality of individual switches, wherein each individual switch is operably coupled to one of the scaled miniature representations of a musical instrument, wherein activation of one of the individual switches is configured to cause the one or more speakers to emit the sound of a recorded drum performance and initiate a sequential illumination of the lights in appropriate drum shells of the drum set.

12. The miniature interactive lighted electronic drum kit of claim 11, wherein at least one light source of the plurality of light sources is disposed along a circumference of a rim of the bass drum, wherein the plurality of light sources are configured to selectively flash in either a clockwise pattern, counter clockwise pattern, or a single burst upon receiving a corresponding electrical input from the microcontroller.

13. The miniature interactive lighted electronic drum kit of claim 1, wherein the bass drum further comprises a digital display disposed on a front side of a drumhead of the bass drum.

14. The miniature interactive lighted electronic drum kit of claim 13, wherein the digital display comprises a digital clock.

15. The miniature interactive lighted electronic drum kit of claim 1, wherein the scaled miniature representation of a musical instrument includes dimensions that are $\frac{1}{8}$th the size of a dimension of a full-size counterpart of the scaled miniature representation of a musical instrument.

16. A miniature interactive lighted electronic drum kit, comprising:
a base member including a drum set and cymbal set, wherein the drum set cymbal set each includes at least one scaled miniature representation of a musical instrument;
one or more speakers;
a plurality of light sources;
a microcontroller in operable communication with a power source, the one or more speakers, and the plurality of light sources;
a switch operably connected to the microcontroller, wherein the switch is configured to cause the microcontroller to transmit electrical signals to the one or more speakers and to at least one of the plurality of lights upon actuation of the switch; and
a microphone configured to receive audio input, and a field-programmable gate array system operably connected to the microcontroller, wherein the field-programmable gate array system includes a logic that is configured to interpolate, in real time, unique frequency signatures of the received audio, wherein the microcontroller is configured to illuminate at least one light source of the plurality of light sources and or move the appropriate cymbal in a pattern that corresponds with the unique frequency signature of a corresponding drum or cymbal of the drum set and cymbal set, as determined by the field-programmable gate array system's logic.

17. A miniature interactive lighted electronic drum kit, comprising:
a base member including a drum set and cymbal set, wherein the drum set cymbal set each includes at least one scaled miniature representation of a musical instrument;
one or more speakers;
a plurality of light sources;
a microcontroller in operable communication with a power source, the one or more speakers, and the plurality of light sources;
a switch operably connected to the microcontroller, wherein the switch is configured to cause the microcontroller to transmit electrical signals to the one or more speakers and to at least one of the plurality of lights upon actuation of the switch; and
a microphone configured to receive audio input, and a field-programmable gate array system operably connected to the microcontroller, wherein the field-programmable gate array system includes a logic that is configured to interpolate, in real time, unique frequency signatures of the received audio, wherein the microcontroller is configured to illuminate at least one light source of the plurality of light sources and or move the appropriate cymbal in a pattern that corresponds with the unique frequency signature of a corresponding drum or cymbal of the drum set and cymbal set, as determined by the field-programmable gate array system's logic; and a non-transitory memory in operable communication with the microcontroller, wherein the electrical signals comprise audio or digital data that is stored in the non-transitory memory, such that the microcontroller is configured to access the audio or digital data for playback upon actuation of the switch.

* * * * *